(12) United States Patent
Cohen et al.

(10) Patent No.: US 9,886,415 B1
(45) Date of Patent: **\*Feb. 6, 2018**

(54) PRIORITIZED DATA TRANSMISSION OVER NETWORKS

(71) Applicant: Google Inc., Mountain View, CA (US)

(72) Inventors: David M Cohen, San Jose, CA (US); Vincent Y Mo, Sunnyvale, CA (US); Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 1145 days.

This patent is subject to a terminal disclaimer.

(21) Appl. No.: 13/947,902

(22) Filed: Jul. 22, 2013

(51) Int. Cl.
*G06F 15/16* (2006.01)
*G06F 15/163* (2006.01)

(52) U.S. Cl.
CPC ................. *G06F 15/163* (2013.01)

(58) Field of Classification Search
CPC .............. G06F 17/30; G06F 17/30011; G06F 17/30014; G06F 17/30017; G06F 17/30023; G06F 17/30058; G06F 17/30194; G06F 17/30283; G06F 17/30386; G06F 17/30575; G06F 17/30861; G06F 17/30864; G06F 17/30867; G06F 17/30873; G06F 17/30876; G06F 17/30879; G06F 17/30882; G06F 17/30884; G06F 17/30887; G06F 17/30893; H04L 51/10; H04L 61/2069; H04L 65/4069; H04L 65/60; H04L 65/4084; H04L 67/02; H04L 67/06; H04L 67/104; H04L 67/1002; H04L 2029/06054; H04N 1/00156; H04N 1/00161; H04N 1/00164; H04N 21/00; H04N 21/4622; H04N 21/64707; H04N 21/21; H04N 21/222; H04N 21/2221; H04N 21/2223; H04N 21/2225
USPC ....... 709/217–219, 230–232; 725/34, 46, 90, 725/118, 120, 148; 370/473–474
See application file for complete search history.

(56) References Cited

U.S. PATENT DOCUMENTS

| 7,490,342 | B2 | 2/2009 | Echigo |
| 7,826,657 | B2 | 11/2010 | Zhang |
| 8,218,736 | B1 | 7/2012 | McClintock et al. |
| 8,358,688 | B2 | 1/2013 | Suneya |

(Continued)

OTHER PUBLICATIONS

U.S. Appl. No. 13/794,759, filed Mar. 11, 2013, titled "Transmission of Information During Low-Bandwidth Network Service."

*Primary Examiner* — Oscar Louie
*Assistant Examiner* — Da T Ton
(74) *Attorney, Agent, or Firm* — IP Spring

(57) ABSTRACT

Implementations relate to prioritized data transmission features over networks. A method can include deriving description data from content data. The description data describes content of the content data and includes one or more portions corresponding to one or more portions of the content data. The description data is transmitted to a destination over a network to be made accessible over the network at the destination to one or more users. The content data also is transmitted to the destination to be made accessible. At least one portion of the description data finishes transmitting and is made accessible before its corresponding portion of the content information finishes transmitting and is made accessible.

20 Claims, 5 Drawing Sheets

(56) References Cited

U.S. PATENT DOCUMENTS

| | | | |
|---|---|---|---|
| 8,527,602 B1* | 9/2013 | Rasmussen | H04N 21/440263 709/207 |
| 9,160,801 B1* | 10/2015 | Wise | H04L 12/1813 |
| 9,461,955 B1 | 10/2016 | Sherrets | |
| 2002/0056127 A1 | 5/2002 | Amir | |
| 2005/0209927 A1* | 9/2005 | Aaltonen | G06Q 30/0601 705/26.1 |
| 2009/0182886 A1 | 7/2009 | McCartie | |
| 2009/0310508 A1 | 12/2009 | Ou et al. | |
| 2013/0117381 A1 | 5/2013 | Garcia et al. | |
| 2014/0074986 A1* | 3/2014 | Stoop | H04L 67/02 709/219 |
| 2014/0146676 A1 | 5/2014 | Howes et al. | |
| 2014/0164507 A1 | 6/2014 | Tesch et al. | |

* cited by examiner

PRIORITIZED DATA TRANSMISSION OVER NETWORKS

BACKGROUND

Electronic devices have become widespread and popular, including home devices and portable devices such as portable phones, desktop and laptop computers, tablet devices, entertainment devices (game devices, televisions, video and audio output devices, etc.). Many such devices include network functionality to allow transmission of data over the Internet, wireless networks, cell phone networks, and other networks. Such networks allow communication locally between devices using, for example, Wi-Fi networks, and also communication remotely over Internet and cell phone networks. In some examples, users can upload data to servers connected to the Internet and/or wireless networks, and the data can be accessed by other devices and users connected to these networks, e.g., via a network service such as a web service, cloud service, or other service implemented on the servers.

SUMMARY

Implementations of the present application relate to prioritized data transmission features over networks. In some implementations, a method includes deriving description data from content data. The description data describes content of the content data and includes one or more portions corresponding to one or more portions of the content data. The method causes the description data to be transmitted to a destination over a network to be made accessible over the network at the destination to one or more users. The method also causes the content data to be transmitted to the destination to be made accessible over the network at the destination to the users. At least one portion of the description data finishes transmitting and is made accessible before its corresponding portion of the content information finishes transmitting and is made accessible.

In various implementations of the method, a sending device transmits the description data and the content data to the destination which is a server system, where the content data is collected at the sending device from one or more local devices in communication with the sending device. The description data can be smaller in amount than the content data, and the destination can include a server system providing a network service over the network that enables users to access the description data and the content data received at the server system. The description data can includes various types of data, such as metadata of the content data that relates to the content, thumbnails generated from image content data, and/or text keywords or text abstracts extracted from text content data.

Content data transmission can include estimating an importance of different portions of the content data to at least one user, including estimating how likely the at least one user will interact with the different portions of the content data, and prioritizing transmission of the different portions of the content data based on the estimation. The prioritizing of transmission can include determining a priority for each of the portions of the content data based at least in part on one or more characteristics of the portion of content data. One or more commands can be received from the destination to instruct or modify the prioritization of the transmission. Some implementations can include organizing the content data into the portions of content data based on one or more characteristics of the content data.

In some implementations, the content data transmission can include examining one or more characteristics of the portions of content data, assigning a priority to each of the portions based on the characteristics, and causing the portions to be transmitted in an order based on the assigned priorities. For example, the characteristics can include a time of creation or last time of editing of the portions of the content data, and/or recognized subjects depicted in the portions of the content data, such as faces of persons depicted in the content data portions. Some methods can determine an identity of faces depicted in the content, and the assigned priority can be based on a social connection of the person of identified face in relation to a sending user associated with a device transmitting the content data. The assigned priority to each portion of the content data can be determined based on information received from the destination indicating whether a user is currently requesting access or has recently requested access within a predetermined time window to the portion of the content data.

In some implementations, a method includes deriving description data from content data. The description data describes content of the content data and is smaller in size than the content data, and the description data includes one or more portions corresponding to one or more portions of the content data. The method causes the description data to be transmitted to a destination over a network to be made accessible over the network at the destination to one or more users. The method also causes the content data to be transmitted to the destination to be made accessible over the network at the destination to the users. At least one portion of the description data finishes transmitting and is made accessible before its corresponding portion of the content information finishes transmitting and is made accessible. The method estimates an importance of different portions of the content data to at least one user, including estimating how likely the at least one user will interact with the different portions of the content data, and prioritizes transmission of the different content data portions in a transmission order based on the estimation.

In some implementations, a system comprises a storage device and at least one processor accessing the storage device and operative to perform operations. The operations include determining deriving description data from content data, where the description data describes content of the content data and includes one or more portions corresponding to one or more portions of the content data. The operations include causing the description data to be transmitted to a destination over a network to be made accessible over the network at the destination to one or more users, and causing the content data to be likewise transmitted and made accessible. At least one portion of the description data finishes transmitting and is made accessible before its corresponding portion of the content information finishes transmitting and is made accessible.

In various implementations of the system, the description data is smaller in amount than the content data, and the destination includes a server system providing a network service over the network that enables the one or more users to access the description data and the content data received at the server system. Causing the content data to be transmitted can include includes estimating an importance of different portions of the content data to at least one user, including estimating how likely the at least one user will interact with the different portions of the content data, and prioritizing transmission of the different portions of the content data based on the estimation. The prioritizing of transmission can be based on information received from the destination indicating whether a user is currently requesting access or has recently requested access within a predetermined time window to the portion of the content data.

DETAILED DESCRIPTION

Figure 1:
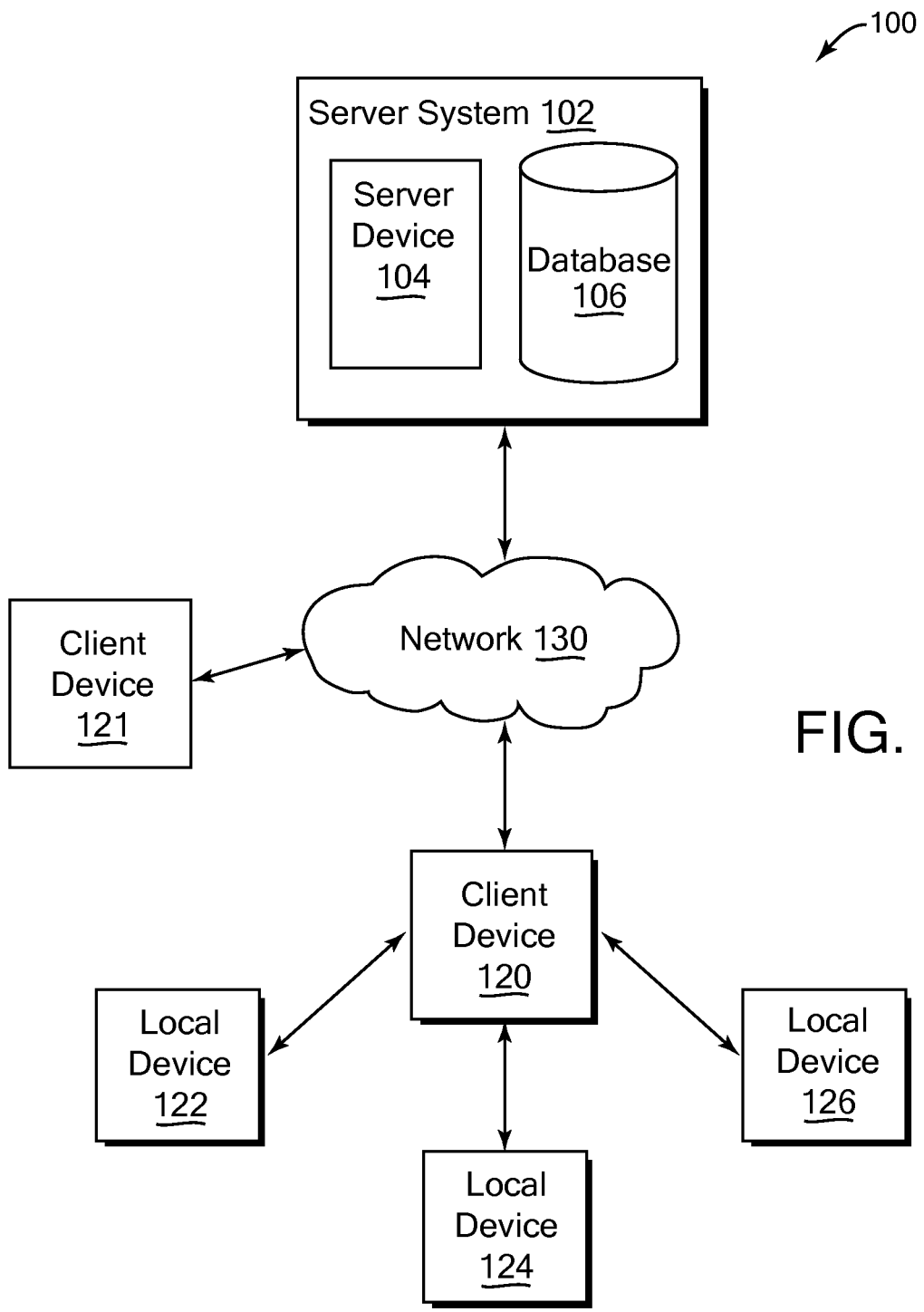
FIG. 1 is a block diagram of an example network environment which may be used for one or more implementations described herein.

One or more implementations described herein relate to providing prioritized transmission of data over networks. In some implementations, data transmission can include transmitting content data from a local system such as a client device to a remote system such as a server. The system can transmit description data derived from and describing the content data, and transmit the content data such that it finishes transmission and is made accessible at the destination after the description data finishes transmission. Some implementations can organize the content data into portions which are assigned different priorities, and these portions can be transmitted in an order based on the priorities. Such features allow efficient upload of descriptions of content data as well as the more relevant portions of content data to servers and network services that can be quickly accessed by users.

Users of devices may have large amounts of content data stored on their local devices. For example, users may store photos and other images, audio data such as music or voice recordings, personal video clips and data, text and graphical documents, etc. on their local devices such as desktop computers, hard drives and memory drives, memory cards and sticks, cameras, cell phones, tablets, entertainment devices, etc. In many cases, users want to upload such types of content data to a destination over a network, such as a server system. For example, network services such as a content access services (allowing users to store their content on servers and make it accessible to other users), social networking services, cloud services, or other services can be destinations that offer accessibility to uploaded content data by other devices and users connected to a network such as the Internet. However, transmitting content data to a server from a local client device often takes a long time due to the large amount of data as well as due to slower upload transmission speeds, slower cell phone networks or other wireless networks, and/or other limitations on network bandwidth. For example, it may take days to upload content data from a mobile device to a network service due to use off low-bandwidth networks. During that long period of time, the uploading content data cannot be accessed at the network service.

Disclosed features allow relevant content data to be accessed more quickly at a destination over a network. In some implementations, a system obtains content data such as images, text data, audio data, video data, or other content data. For example, in some implementations the system can be a local device that can automatically collect content data from other local devices which store the content data. The system derives description data from the content data which describes content in that data. For example, the description data can be extracted from the content data, such as keywords or abstracts extracted from text data or image frames extracted from video data, and/or can be data derived from the content data, such as small thumbnail images generated from full images, metadata provided in the content data that describes portions of the content data.

The system transmits the description data to a destination over a network to be made accessible over the network at the destination by users. For example, the system can upload the information to a network service implemented on a server system, where the description data can be accessed over the network by users of the network service. The system transmits the content data to the destination to be made accessible to users over the network. The content data finishes transmitting and is made accessible after the description data finishes transmitting and is made accessible. Some implementations can organize the content data into portions and prioritize the transmission of the content portions during the second stage transmissions, where the system transmits the portions in an order based on the assigned priorities. For example, the system assign priorities to the different portions based on an estimation of the importance of the portions to one or more users. In some implementations, the system estimates importance based on how likely the different portions of content are to be accessed at the destination by one or more users, where portions that are more likely to be accessed are assigned higher priorities. For example, the system can assign priorities based on one or more characteristics of the portions of content data. In some examples, the characteristics can include a time of creation or last edit time of the portion, and identified subjects depicted in the content portions such as persons, and the quality of the content. Some implementations can assign priorities to the different portions based on the occurrence of events. For example, if a particular portion of content data is currently requested by a user for access at a server, the system can raise the priority of transmission for that content portion to a higher level.

Described features allow important content to be available for access and processing at a network destination more quickly than if transmitting the content data normally. Description data that typically is much smaller in size can be first transmitted to the destination to allow users to quickly view descriptions of the content at the destination and determine which content portions are of interest. Furthermore, the full content data can be organized into portions and transmitted according to the importance of the portion to users and how likely users are to want full access to the full content portions. The system can perform automatic analysis and prioritize the transmission of content portions based on various content characteristics and user preferences, as well as prioritize content portions that are requested by users. Furthermore, features can include a sending device that can collect content data from local devices and upload the content data to server systems. Such a device can perform the upload instead of mobile devices, thus saving bandwidth and battery life on the mobile devices for uploads of large amounts of content data.

FIG. 1 illustrates a block diagram of an example network environment 100, which may be used in some implementations for one or more features described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as a client device 120, which may communicate with the server system 102 via network 130 and communicate with other devices connected to the network 130 via network 130 and/or via server system 102. Network 130 can be or include any type of communication network, including one or more of the Internet, cell phone networks, local area networks (LAN), wireless networks, switch or hub connections, etc. In other implementations, network environment 100 may not include all of the components shown and/or may have other elements including other types of elements instead of, or in addition to, those described herein.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130.

Client device 120 is connected to the network 130, e.g., via wired and/or wireless communication links. Client device 120 can be any type of electronic device, such as a computer system, desktop computer, portable device, cell phone, smart phone, tablet computer, camera, virtual reality or augmented reality head-mounted display devices (e.g., goggles or glasses), television, TV set top box or entertainment device, personal digital assistant (PDA), media player, game device, household or workplace appliance, server or mainframe computer system, embedded device, etc. There may be additional client devices connected to network 130, such as client device 121. In some example implementations, client device 120 can be a dedicated hardware device used for content data collection and uploading that provides one or more data transmission features as described herein. For example, a dedicated device including a processor, memory, storage, and network functionality can be used to implement the data transmission features. Other implementations can incorporate the one or more described data transmission features in other types of client devices, e.g., using hardware and/or software. For example, software running on a desktop computer, cell phone, tablet computer, or other device can implement the data transmission features.

One or more local devices 122, 124, and 126 can be included in environment 100 in some implementations. Local devices 122-126 can be devices similar to the client devices 120 and 121, and/or can be other types of devices such as dedicated (e.g., external) storage hard drives or memory drives, peripherals, cameras, or other devices including storage that can store content data. In various implementations, the client device 120 can collect content data from one or more of the local devices 122-126, and/or local devices 122-126 can send content data to the client device 120. Content data obtained by the client device 120 from the local devices 122-126 can be transmitted (e.g., uploaded) to the server system 102. Such functionality is described in greater detail below.

In various implementations, a user may communicate with the server system 102 via client device 120 as well as communicate with other client devices connected to network 130 or server system 120. For example, a user can receive messages and notifications via a social network service implemented by server system 102. In one example, users of client devices may interact with each other via the social network service, where respective client devices transmit messages and data to one or more server systems such as system 102, and the server system 102 provides appropriate data to the client devices such that each client device can receive shared content uploaded to the social network service via the server system 102. One or more users can each be associated with multiple client devices in some implementations.

A social networking service provided by system 10 can include any system allowing users to perform a variety of types of communications, form links and associations, upload data such as content data to storage devices of the service, post, view, and download shared content data, and/or perform other socially-related functions. For example, the social network service can allow a user to send messages to particular or multiple other users, form social links in the form of associations to other users within the social network system, group other users in user lists, friends lists, or other user groups, post or send uploaded content data including text, images (such as photos), video sequences, audio sequences or recordings, or other types of content for access by designated sets of users of the social network service, send multimedia information and other information to other users of the social network service, participate in live video, audio, and/or text chat with other users of the service, etc. Some implementations can provide one or more "activity streams" of information for a user, which can display information and content posted by the user as well as information and content data posted by other users of the social networking system. For example, in some implementations a user can instruct the system that the content data from other particular designated users be included in the user's activity stream, while content data from other users is not included in that activity stream.

As used herein, the term "social network service" can include a software and/or hardware system that facilitates user interactions, and can include a service implemented on a network system. A "social link" is any social connection between multiple users that allows these users to more easily communicate, view and find statuses of the other users, and/or otherwise relay information between each other. For example, adding another user to a first user's group of known users is adding a social link between these users. In some implementations, a "user" can include one or more programs or virtual entities, as well as persons that interface with the system or network.

Furthermore, a user can designate one or more user groups, such as friends, family, occupation or company, etc., to allow users in the designated user groups to access or receive content and other information associated with the user on the social networking service. A user's user groups each specify one or more users of the social network service with which the user has a social link. A user (or the social networking service, in some implementations) can add users to particular user groups as desired and can designate the amount of access and/or sharing of content data or other data with each user group. For example, the user can designate that the users in one user group can access content data (e.g., receive and view the content on their client devices from the social networking service) which the user posts on the social networking service, such as text messages, audio messages, and graphical images. Or, the user can designate that the users in a different user group can access user profile information of the user, such as identifying information, opinions, hobbies, interests, etc. In some implementations, the access of users to user information can be designated in terms of larger groups, such as a "public" setting designating all the users of the social network service, "acquaintances" to indicate friends of friends, or a different privacy level setting. Some implementations of a social networking service allow the user to designate groups of users including extended or additional social linked levels (degrees of separation) of users. A user may also be able to designate other groups or sets of users regardless of whether those other users are in the user's own listed groups.

A social networking service can receive data such as the description data and content data described herein and can present this data for access by users of the service, as governed by the sending user's account settings and/or selections. For example, description data can be displayed in an activity stream or posting area of the sending user, can be sent to socially-connected users in messages, etc. For example, users can access uploaded description data and content data by accessing the sending user's profile or content display areas. The social networking service can also process the uploaded data to identify users depicted in the data, form additional social connections for the sending user based on such identified users, organize the content data based on the sending user's settings, and other related processing.

A social networking interface, including display of content and messages, privacy settings, notifications, and other features described herein, can be displayed using software on the client device, such as application software or client software in communication with the server system. The interface can be displayed on an output device of the client device, such as a display screen (touchscreen, etc.). For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

Some implementations can provide other types of network services using server system 102 and network 130, such as cloud services, content access services, etc. For example, data storage systems can receive content data uploaded from client devices such as client device 120, and store the content data on database 106 or other storage device of the server system. The uploaded content data can be accessed by client device 120 and by other client devices and users over network 130 when desired. Other network services such as "content access services" can provide photo sharing and other image sharing, document sharing, and sharing of other types of content data, where a service can store and organize content data has been uploaded from the user's client device 120 to the server system 102, and authorized users can connect to the service to access shared content data. For example, some services can categorize content, auto-correct defects in the content (e.g., color correct images, sharpen images, spell-check documents, etc.), and/or process the content in other ways. Some data storage network services can provide a cloud drive which can act as a hard drive or other storage for a client device to store a device's files and directories. Many other types of storage services, content access services, and other network services can be implemented by server system 102 and can receive content data from client device 120 over network 130.

Other implementations can use other forms of devices, systems and services instead of the systems and services described above. For example, users and client or server devices accessing any type of communications network, computer network, or network/storage service can make use of features described herein. Some implementations can provide features described herein on systems such as one or more electronic devices that are intermittently connected to computer networks.

Figure 2:
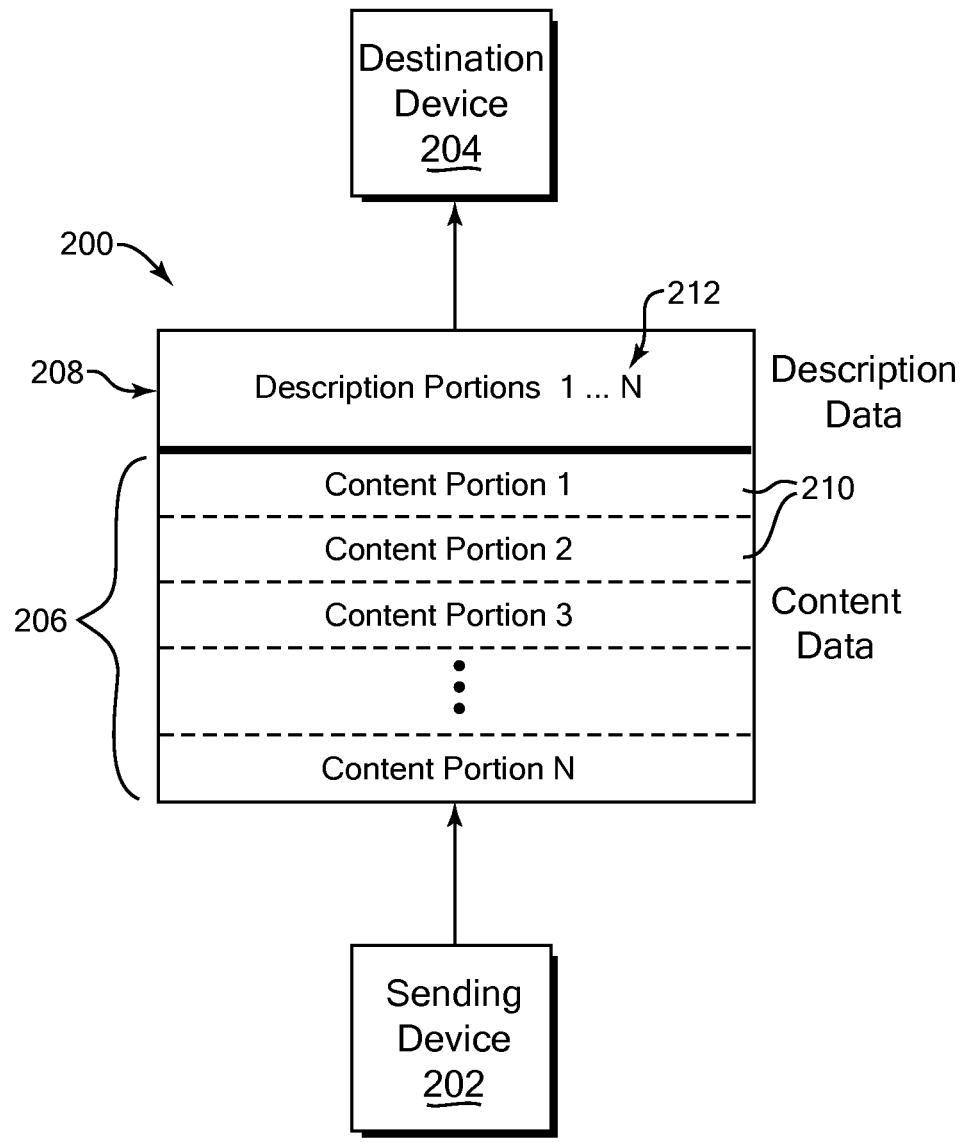
FIG. 2 is a diagrammatic illustration of one example of data that can be transmitted according to one or more features described herein.

FIG. 2 is a diagrammatic illustration of one example of data 200 that can be transmitted according to one or more features described herein. Data 200 is transmitted between a sending device 202 and a destination device 204. Data 200 includes content data 206 and description data 208.

Content data 206 is to be sent from sending device 202 over a network to one or more receiving devices or nodes on the network, which are referred to as a "destination" such as destination device 204. For example, data 200 can be transmitted over a network by a sending device such as client device 120 to a destination device such as server system 102 shown in FIG. 1.

In some implementations, content data 206 is provided by a user who owns the content data or a user who has authorization and/or access to send the content data over the network to the destination device 204. Such as a user can be referred to herein as a "sending user." In some examples, this user can be a user who created or originated the content data or who otherwise has access or control of the content data, and whose preferences and decisions control the sending of the content data, control its accessibility at the destination device by users, and/or control its use and processing at the destination device. In some examples, the sending user is a user or account that controls the sending of the content data, e.g., whose preferences, settings, and/or behavior can help determine transmission priorities and other transmission features as described herein. In other implementations, there may be multiple users associated with the content data 206, e.g., users who own or have control over the same or different portions of the content data, and in some examples, the transmission of different sections of the content data owned or controlled by associated users can be affected by one or more of those associated user's selections, preferences, and/or settings.

Content data 206 can be any data providing content for viewing, editing, and/or other actions or experience by users. The content data can be of any type, such as text content (e.g., visual documents, spreadsheets, web pages, etc.), image content (e.g., photos, images within documents, scans of documents or images, computer-generated images, etc.), audio content (e.g., music data, voice recording data, voice synthesis data, podcasts, etc.), video content (e.g., movie data, home visual recordings, animations, etc.), haptic content (e.g., force data for producing haptic sensations, etc.), and/or mixtures of two or more of these types. The content data can be used, for example, to output its content to a person visually, aurally, haptically, etc. by a visual display device (display screen, touchscreen, etc.), audio output device (speakers, etc.), haptic output device (motors, actuators, etc.), and other output devices.

Description data 208 is also included in data 200 and is sent by sending device 202 over the network to the destination device 204 before content data 206 is sent to that destination. Description data 208 is information derived from the content data and describes content in the content data. For example, the description data 208 finishes its transmission to the destination device 204 before the content data 206 finishes its transmission to the destination device. Typically, the description data is of smaller size than the content data, and thus can be transmitted more quickly to the destination to provide earlier access at the destination to a description of the content data. In some examples, the description data 208 can be a small fraction of the content data in size. Examples of description data can include parts of the content data itself, data derived from the content data that describes the content data, metadata, or other data as described in greater detail below.

In some implementations, the content data 206 can be organized into multiple portions 210. Each portion can correspond to a content item (such as a self-contained or complete content item like an image, document, etc.), file, or other content portion in various implementations. Similarly, description data 208 can include portions 212 which can each correspond to a portion 210 of the content data. For example, a description portion 212 can be an extracted portion of text that corresponds to the full text portion 210 in the content data, or a description portion 212 can be a thumbnail image of a full image portion 210 in the content data. In other implementations, description portions 212 do not correspond to the content portions 210 and can be different groupings of description data.

Some implementations can transmit the portions 212 of the description data 208 in any order. For example, the amount of description data 208 may be small enough such that the order of transmission does not make a significant difference to its accessibility. In other implementations, the description portions 212 can be ordered in their transmission so as to transmit more important portions first and allow these portions to be accessible quickly. For example, the transmission order of description portions 212 can be the same or similar to the transmission order of corresponding content portions 210.

Content portions 210 can be transmitted in a particular determined order in some implementations. In one example, a content portion 1 of the content data can be transmitted after the description data 208 and before a content portion 2, content portion 2 can be transmitted before content portion 3, and so on until the last content portion N is transmitted. In some implementations, these portions can be ordered based on their importance to one or more users, e.g., how likely these portions will be accessed at the destination device once they are received at the destination. By sending more important portions of the content first, these portions are more quickly available to users and processes of one or more network services at the destination device. Prioritization of portions of content is described in greater detail below.

Figure 3:
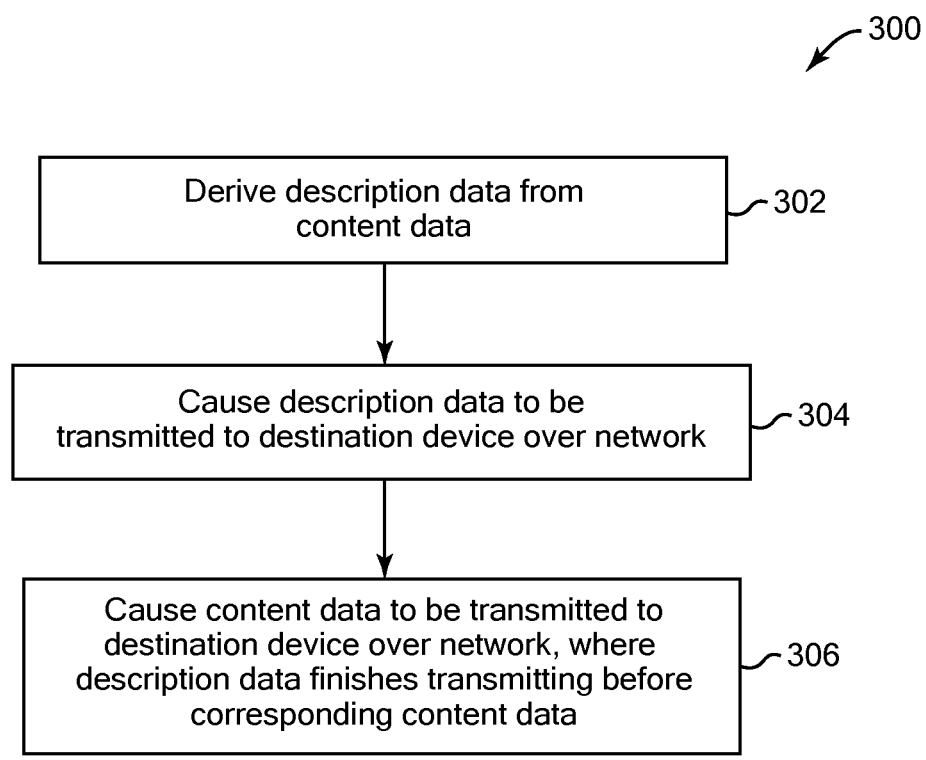
FIG. 3 is a flow diagram illustrating an example of a method for providing prioritized transmission of data over networks, according to some implementations.

FIG. 3 is a flow diagram illustrating an example of a method 300 for providing prioritized transmission of data over networks, according to some implementations. Method 300 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 300 can be performed as part of or component of an application running on a client device and/or server device, or as a separate application or software running in conjunction with other applications and operating system. For example, the method 300 can be implemented by a separate application program or other program running on a device, or can be implemented within an existing program running on the device to provide communication functions.

In block 302 of method 300, the method derives description data from content data. The content data can be of any type, such as text content, image content, audio content, video content, haptic content, and/or mixtures of two or more of these types as described above. As described above, the description data describes content in the content data. In typical implementations, the description data is of smaller size than the content data, and can be orders of magnitude smaller in size in some implementations.

In various implementations, the method can derive description data by examining and/or processing the content data and extracting and/or determining description data from the examined or processed data. For example, the method can extract parts of the content data as description data. In another example, the method can process content data to generate description data. In another example, the method can obtain metadata for the content data as description data. Some examples of deriving description data are described below with reference to FIG. 4.

In block 304, the method causes the description data to be transmitted to a destination device over a network. In some implementations, the description data is transmitted over a network 130 from a sending device such as client device 120 to a destination device such as server system 102. Received description data can be made available for "access" at the destination device to one or more users. For example, the uploaded description data can be searched, downloaded, viewed (by downloading visual data derived from the data), or otherwise accessed by users and devices that communicate with the destination device over the network. Since the description data is typically of relatively small size compared to the content data, the description data can be transmitted to the destination device relatively quickly. This allows, for example, the description data to be accessible to users, devices, and/or processes (such as network service processing) over the network at the destination relatively quickly, and more quickly than waiting for the content data itself to be transmitted.

In block 306, the method causes the content data to be transmitted to the destination over the network. In this block, all or part of the content data is transmitted to a destination device, such as from client device 120 to the server system 102. The content data can be made available for access and processing at the destination device to one or more users. For example, the uploaded content data can be searched, downloaded, viewed (e.g., by downloading visual data derived from the data), or otherwise accessed by users and devices that communicate with the destination device over the network. A network service at the destination can also process the uploaded content data for storage, organization, display, indexing, etc. Some implementations can make earlier-transmitted parts of the content data available for access and processing before later-transmitted parts of the content data are available.

Various implementations can transmit the content data according to particular methods. For example, in some implementations the content data can be provided or organized in portions and the content portions prioritized according to particular criteria. The higher-priority content portions can be transmitted before the lower-priority portions. Some examples of such implementations and features are described in greater detail below with respect to FIG. 4.

The description data finishes transmitting before corresponding content information finishes transmitting. For example, portions of the description data can be made accessible at the destination before their corresponding portions of the content data finish transmitting and are made accessible at the destination. Since the description data is smaller in size, it will finish transmitting before corresponding content data, and the description data will be accessible to users at the destination before the corresponding content data is accessible. This can allow users and processes to access description data more quickly at the destination. In some implementations, the content data is started to be transmitted and finishes transmission after the description data is completely transmitted and made accessible in block 304. In other implementations, content data can be transmitted at least partially simultaneously with description data in block 304. For example, the content data can start being transmitted while description data is still being transmitted. In some cases or implementations, one or more portions 208 of the description data complete transmission and are entirely accessible before any portion 206 of the content data is finished transmitting and made accessible. In some implementations using at least partially simultaneous transmission of description data and content data, each portion of the description data can complete transmission and be made accessible before its corresponding portion of the content data has finished transmitting, but some content portions may finish transmission before some non-corresponding portions of description data.

Figure 4:
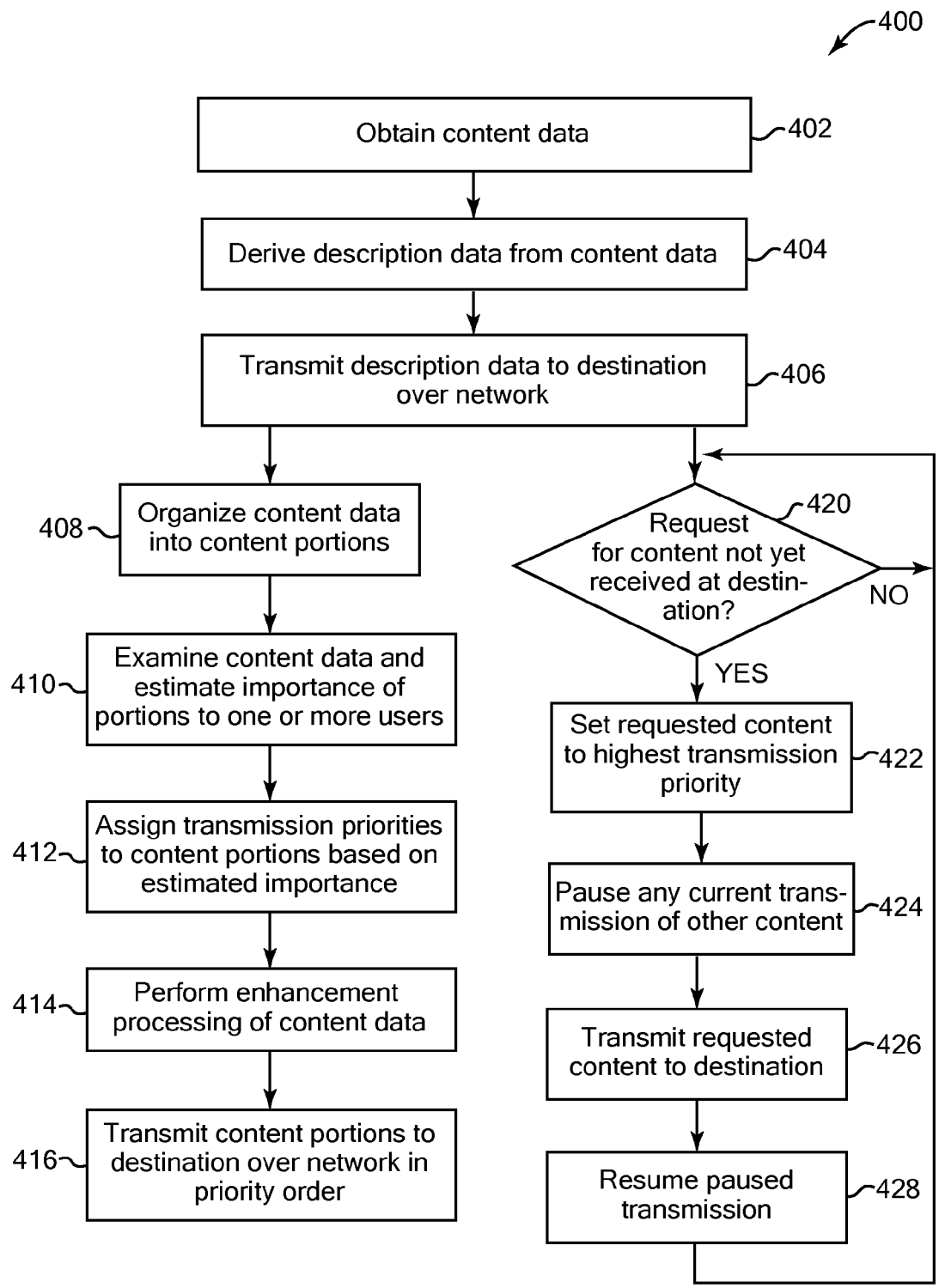
FIG. 4 is a flow diagram illustrating an example implementation of a method for providing prioritized transmission of data over networks.

FIG. 4 is a flow diagram illustrating an example implementation of a method 400 for providing prioritized transmission of data over networks. Similarly to method 300, method 400 can be implemented on any of various devices as described above.

In block 402, the method obtains content data. In some implementations, the content data can be received on a sending device such as client device 120 from one or more sources. For example, one or more users can direct content data to storage on a client device 120 via a network or by connecting storage media. In one example, a user can provide content data to the sending device by connecting or inserting physical storage media (e.g., a portable memory drive, memory card, camera or other portable device, optical disc, etc.) to a hardware interface port or input device of the sending device to transfer the content data to the sending device from the physical media.

In some implementations, a sending device can autonomously collect content data from local devices, such as local devices 122-126 shown in FIG. 1, to obtain content data. For example, the collecting device can import content data from a desktop computer, laptop computers, cell phones, tablet computers, and other devices that are local to the collecting device and connected to the collecting device via wireless and/or wired local networks (e.g., an Ethernet LAN, Wifi network, etc.) or other communication channels. For example, such features can save battery and bandwidth on mobile devices by collecting the content data locally with faster local networks (e.g., Wi-Fi) and performing the upload of the content data to the destination device (as in block 416 below), instead of the mobile device having to perform the upload using slower cell phone networks. Such a collecting device can perform the upload (e.g., as in block 416 below) at its leisure, freeing up normal use of the mobile device. In some implementations, the collecting device can also receive content data from local devices that are connected directly to the collecting device via connectors or ports on the collecting device. Some implementations of the collecting device can receive content data periodically from local devices, such as by polling local devices for predetermined time periods and retrieving any content data that has been added or changed since the last collection of content data.

In block 404, the method derives description data from the content data. In this example, the description data in total is a smaller amount of data than the content data, allowing description data to be uploaded to a destination more quickly than uploading corresponding content data. In some implementations, portions of description data can be derived from corresponding portions of content data. For example, if content data is organized into different items of content such as images, documents, audio selections, etc. (e.g., organized into files or other units), then a portion of description data can be an item derived from the corresponding content item. Other portions of content data can be used to derive description data in other implementations.

In some examples, the method can derive description data by taking extracted parts of the content data itself as description data. For example, the description data can include parts of text from a text document that can be useful in summarizing or describing the content of the text document, such as an abstract or one or more initial sentences or paragraphs in the text document. Some implementations can extract words or phrases (e.g., keywords or key phrases) from text content data, e.g., which can also be used for searching of text to find topics of interest. Keyword extraction techniques can be used to determine such words or phrases, e.g., by examining frequency of word use, looking for nouns, comparing to known terms, etc. to find important words and phrases. In examples for other content types, the description data can include an extracted small part of audio data, such as a clip of 5 or 10 seconds of a music selection or file, voice recording file, etc., or a portion of an image or video, such as a portion of an image depicting a face, one or more selected frames of a video file, etc.

Description data can also be derived from the content data or portions thereof by processing content data to generate the description data into a particular form. In some implementations, the processed form of description data can be a representation of or "proxy" for the corresponding content data. In one example, an image can be processed and a "thumbnail" image generated from the image, where the thumbnail has less data (e.g., less pixel resolution) but retains an overall appearance of the original image. Some processes can reduce a large section of text content to a compressed form by removing some words or sentences, such that the compressed form has less data than the original content data. Content data such as audio or video data can be compressed into smaller forms having less data and less fidelity than the original. In some implementations, all (or a significant portion) of the content data can be processed into representational proxy data that is smaller in data amount, and can be sent to the destination device (or other remote device) for evaluation, as described below.

Description data can be derived by processing the content data in other ways, such as by recognizing subjects depicted in content data. For example, in image content, objects can be recognized based on object recognition techniques, including faces recognized by facial recognition techniques. Recognized face or other object information can be provided as description data, e.g., as labels of recognized objects such as "face," "car," etc. In some implementations, identity information based on recognized objects can be provided as description data, such as information describing recognized and identified users, objects, etc. For example, in some implementations, the sending device may have access to user information and can determine an identity of a user of a network service (such a social networking system) based on recognizing a face depicted in an image using facial recognition techniques and comparisons to known facial information. In some implementations, determination of, access to, and/or use of personal information including user characteristics such as age, gender, identity, etc., may be restricted based on users' control and preferences governing such information.

Description data can also be derived from the content data by obtaining metadata of the content data, which describes or relates to the content in the content data. In some examples, such metadata can include title, author, subject, date of creation, data size, and other descriptive information relating to the content data. For example, for music audio files, such metadata can include artist name, album name, song or track name, year of release, genre, etc. Image content data such as photos captured by a camera can be associated with metadata including exposure settings and other settings of the camera when the image was captured, identification of camera components, timestamp for when the photo was captured, tags or labels describing the content or subjects depicted in the image, etc. Such metadata can be stored with the content data (e.g., in separate fields) or can be stored separately and linked to or otherwise associated with content data.

In some implementations, the block 402 can perform processing needed to produce some or all of the description data, and/or the block 402 can receive description data from another device or process, such as a different system component, a separate process implemented on the sending device 202, or separate device connected to the sending device 202. For example, the other device or process can analyze the content data, derive description data therefrom, and send the description data to the method 400.

In block 406, the method transmits the description data to a destination over the network. For example, a client device 120 (or multiple client devices 120) can send the description data over the Internet to a server system 102 to be stored in a database 106 and/or other storage of the server system. Received description data can immediately be made accessible by the destination device, e.g., by a network service implemented by a destination device such as a server system. In some examples, the receiving server system 120 includes a social networking system, and the description data includes portions such as text abstracts and thumbnail images of the corresponding content portions in the content data such as documents and images. The social networking system receives the description data and can immediately post it in an account or activity stream of the account of the user associated with the uploaded data. Other users of the social networking system can see the description data by accessing the social networking service over the network on their devices and accessing the activity stream of that user in the social networking service. In another example, the description data can be posted on a file hosting service that is hosted by the receiving server system. If a user searches for particular text documents on the server system, the abstracts can be immediately available for search after their upload to the server system is completed.

In this manner, smaller-sized description data that is received by a destination device can be made quickly available over the network by network services. Such data is available much sooner than the corresponding content data, which is much larger in size and takes longer to completely upload to the server system than the description data. In general, the portion of description data corresponding to a portion of the content data can be made available for access over the network on the destination device before the corresponding portion of content data is accessible on the destination device.

In some implementations, the description data can be provided or organized in multiple portions 210 and those portions transmitted in an order based on estimations of the importance of each portions, e.g., how likely that one or more users will interact with that portion of the description data. This can be performed similarly to the organization, prioritization and transmission of the prioritized content data as described below. In other implementations, the total amount of description data to be transmitted is sufficiently small (e.g., the amount of data is under a predetermined threshold amount that can be based on current network bandwidth, etc.) such that organization and ordered transmission of portions of description data is not sufficiently advantageous.

In block 408, the method organizes the content data into multiple content portions to be examined. The criteria for dividing the content data can vary in different implementations. In some implementations, the content portions can be organized based on existing divided portions of the content. For example, each self-contained or complete item of the content can be considered a different portion, where each item can be an image, text document, audio selection, video, etc. In some implementations, such items of content can be provided in data files or equivalent collection of data stored on a storage device. For example, in some cases each item of content is stored in its own file, e.g., one image is provided in each image file, one document in each document file, one audio selection in each audio file, one complete video in each video file, etc., and the method can consider each such file as a different portion of the content data. In some implementations, multiple items of content can be included in each data file and the method can examine each such file as a different portion that includes multiple items of content.

Some implementations can organize the different portions of content based on one or more characteristics of content items or files. For example, a group of multiple data files can be collectively be considered a single portion of the content data, where the files are grouped based on one or more file characteristics such as type of data (image, text, audio, etc.), time of creation, size or amount of content (e.g., in bytes, pages, etc.), particular extension name to the filename, preexisting categories of content (e.g., as indicated by metadata associated with the content), and/or other characteristic. For example, a group of content items that were all created or edited within a particular time period can be grouped as a single portion of the content data. In some non-limiting examples, multiple items in the content having a particular value or range of values for a characteristic, such as a time of capture or creation before a particular date, can be grouped in a content portion, while items having a different value or range of values, such as a different time of creation before that date, can be grouped in a second portion. Types of content can be grouped, such as text data (e.g., documents, spreadsheets, etc.) not having any images in one portion, and text data that includes images (e.g., documents including embedded pictures or diagrams) in another portion. In some implementations, items of content can be extracted from pre-existing structures of data such as data files and considered a portion or combined with other items in a portion, or such structures as files can be divided. In some implementations, a user's specified preferences (e.g., settings) can be examined to determine the organization of the content data into portions.

In block 410, the method examines the different portions of the content data and estimates importance of the different portions to one or more users. The estimations of importance can be performed locally on one or more sending devices and/or remotely over a network on a remote device such as the destination device (or a different remote device having access to importance information, user data, etc.). If performed locally, the sending device(s) can examine the content data and/or the description data. In some implementations, the remote device can send any supplemental reference information to the sending device, if needed for importance estimation. If estimation is performed remotely, in some examples, the remote device can examine the description data and perform the estimation of importance for the content described by that description data. For example, a server system which received the description data can perform the estimation of importance for the corresponding content data based on the description data. In some implementations, the sending device can send importance information used to estimate importance (as described below) to the remote device to perform estimations. The remote device can send its estimated importances, determined transmission priorities, and/or transmission order to the sending device, and/or send commands to the sending device to assign and/or change priorities of content portions, as described below. Some implementations can use a hybrid approach where the local devices and remote devices perform different parts or operations of block 410, and/or simultaneously perform some or all of these parts or operations.

The method can estimate the importance of the different portions of content data to one or more users. In some implementations, this importance can indicate or be based on whether the one or more users are likely to access the particular content portion over the network after that portion is made available at the destination device. The importance can be estimated in relation to one or more users such as the sending user who is transmitting the content data, one or more other particular users having an association with the content data and/or the sending user, and/or general users based on generally known interests and habits of people. Some implementations can estimate each portion of content to be either important or not important, e.g. a binary result. Other implementations can assign a value for importance (e.g., an "importance value") within a predetermined value scale which indicates the importance of a content portion. For example, the importance scale can have multiple (e.g., more than two) possible values in its scale. Some implementations can assign multiple importance values, e.g., one importance value based on likelihood of being accessed, a different importance value based on likely frequency or number of accesses, etc.

In some implementations, the importance of a content portion can be estimated based on a variety of different "signals" or characteristics of the content portion which can be evaluated for importance based on predetermined criteria. In some examples, one or more predetermined characteristics of the content portion can be specified in "importance information," where the importance information also can indicate how to estimate the importance of the examined content portion based on each specified characteristic. For example, the importance information can assign an importance value based on the particular form or type that the characteristic takes on. Such importance information can be stored and accessible to method 400 for the estimation of the importance of different content portions.

One characteristic of a content portion can be examined and used to estimate importance of that content portion. In other implementations, multiple characteristics can be examined and each can provide a contribution used in providing an overall estimation of importance. For example, each importance value for each examined characteristic can be summed and the average used as the overall importance. Some implementations can weight some characteristics more than other characteristics as being more indicative of importance. User preferences can also be consulted as to which characteristics to examine to estimate importance, and/or how to weight particular characteristics in an overall importance determination.

In some examples, the predetermined characteristics can include the time of creation of the content, and the importance information can also specify which time periods are of greater importance. For example, more recently-created content can be specified as more important than older content, since more recent content may be more likely to be accessed by the user who provided the content and/or by other users (e.g., other people who have not yet seen recent content). In some examples, photo images taken during a recent vacation can be considered more likely to be accessed by the user providing the photos and by social contacts of the providing user in a social networking service or online group, than photos taken during a previous vacation or at some other time in the past. In another example, more recent documents created by the sending user can be considered more important. In some implementations, the importance information can indicate that content created within one or more specified time periods will have more importance. Some implementations can also examine the edit times of content portions, where a content portion that was edited (e.g., copied, modified, etc.) by a user within a predetermined time range of the present time can be given higher importance.

In other examples, the predetermined characteristics can include subjects depicted in the content. For example, subjects can be depicted people in images (e.g., any person regardless of identity), or more particularly any person's face depicted in an image, where known object recognition and/or facial recognition techniques can be used as described above. For example, the subjects of people and faces can be associated with a higher importance in the importance information since, in general, viewers like to focus on people and people's faces. Similarly, subjects of animals or particular objects can be associated with higher importance in the importance information due to their general popularity as subjects. For text documents, the content can be analyzed and searched to find particular titles, words, and/or phrases which can be considered more important and more likely to be accessed by the user and/or other users, such as topics in recent news headlines (e.g., sports or movie titles or topics currently popular, generally popular subjects, etc.) when considering importance to general users. For audio content selections, a title, artist, date, or other description metadata information associated with the audio selection can be examined and importance assigned based on the genre of music for a song or album, a particular popular artist, etc. Similarly, a title or other metadata associated with a video content selection can be examined to determine importance of the video selection.

In additional examples, the predetermined characteristics can include the quality of the content. In some implementations, the quality or quality characteristics of portions of the content data can be analyzed for defects which may make the content less desirable and therefore less important. If examined characteristics are outside a predetermined accepted range, then the image can be considered defective and can be assigned less importance. In implementations that use an importance scale values indicating degree of importance, the degree of importance can be assigned based on how much the examined content characteristics deviate from the accepted range. In some implementations, known heuristics and data based on feedback from large numbers of test users can be used to determine which images are considered higher quality. For example, image content can be examined to check for one or more of a variety of different image quality characteristics, including blurriness, contrast, brightness, color cast, gamma, pixel resolution, tilt or rotation of depicted subject matter, people with eyes closed, etc. Text content can be examined to check for spelling, grammar, draft stage (rough draft vs. final draft), etc. Audio content can be examined for sampling rate or other quality characteristics, and video content can be examined for resolution, image quality characteristics in sampled individual frames, etc.

In some implementations, the examined characteristics can also include the number of times that a particular content portion, or content portions that are similar (e.g., by a threshold amount), are repeated within the content. Some implementations can give some or all of the repeated instances of the content portion a very low importance, while assigning one of the instances a higher importance (e.g., the highest quality instance estimated as described above). In some examples, a number of very similar photos may have been taken by a user within a short period of time. These photos can be examined by the method 400 to find that they are very similar (e.g., same faces recognized, same colors, brightness, and other characteristics, and/or created/captured within a threshold range of time), such that only one of these photos is assigned a higher importance. The duplicate or similar photos can be given low importance since they are considered largely redundant and/or if they have lower quality.

The predetermined characteristics can also include characteristics described in metadata associated with a content portion. Some metadata can describe characteristics such as time of creation, depicted subjects (general type of subject and/or identification of particular subjects), etc., which can be used to estimate importance as described above. Some metadata can describe other characteristics such as number of users linked to or receiving the content portion, and/or other users collaborating on a collaborative document or other content item. In some examples, the number of users can be used to estimate the importance, e.g., the greater the number of associated users, the higher the importance. Some metadata can describe geographic location of where the associated content was created, the creator(s) of the content portion, users or other persons referred to (e.g., depicted in) the content (such as tags indicating user names), the types of devices and/or software used to create the content, and other characteristics, any of which can be used in the estimation of importance.

The predetermined characteristics can also include social connection information associated with a content portion which indicates depicted subjects of greater importance. For example, in some implementations, a user who is depicted (pictured, described, referred to, etc.) in the content portion can be identified. For example, for image content, a referred user can be identified using facial recognition performed on the image, by examining tags or other metadata fields associated with the content portion and indicating user identity, by examining names in a document, etc. The social connections of the sending user can be examined to look for the depicted user. For example, if the content is being uploaded to a social networking service, then the social links to other users in that service can be examined, such as user groups, users who have sent messages, etc. In some implementations, the stronger the social connections found to one or more users depicted in the content portion, then the higher the importance assigned to that content portion. For example, a depicted user who is directly socially linked to the sending user (e.g., in one or more user groups of the sending user) can be assigned a higher importance than a depicted user who is linked only through one or more other users to the sending user. Other social information besides social networking service data can also be examined, such as sending user contact lists, users who are most often sent messages by the sending user in one or more applications, email contacts, etc.

Other predetermined characteristics can be examined which are related to one or more users associated with the content portion. For example, one associated user can be the sending user. In some implementations, other users can also be associated users that can influence importance estimation. For example, other users may be associated with a content portion by being authors, contributors, reviewers, etc. for the content in that portion, which can be determined from associated metadata or content portion analysis. Associated users can be socially close to the sending user (or socially close to other users associated with the content portion, e.g., within a predetermined threshold of estimated closeness) as determined from social networking data, messaging data, user contact lists, etc. of the sending user. In some cases, socially-close users may be the most likely other users to access content sent to the destination (besides the sending user), and their preferences can be pertinent to estimating importance of content portions.

Such associated users can influence importance estimation in a variety of ways. One way is through explicit user preferences in stored settings, which can specify importance information that can be used to estimate importance of content portions associated with the user. For example, preferences can be provided in settings stored locally at the sending device or remotely at the destination or other device. In some examples, a user can specify in preferences any characteristics of content and the importance information used to determine the importance of the content, such as any of the characteristics described above. A user may in some implementations be able to specify the number of importance levels and how particular characteristics of content translate to the importance levels.

Another way that associated users can influence importance estimation is through their implicit preferences indicated by user behavior. For example, messages and other interactions of the associated user on a social networking service or other network service can be examined to determine content characteristics that the associated user finds important, and the particular form(s), values, or selections that the associated user prefers for each characteristic. For example, user behavior indicating a user preference for certain types of content, recent creation/editing times, particular subjects, content by particular authors, etc. can be used to help determine importance of any content portion associated with that user.

In block 412, the method assigns transmission priorities to the content portions based on their determined estimated importance as described above. In general, the higher the importance value estimated in block 410 for a content portion, the higher the transmission priority assigned to that content portion. In some implementations, the transmission priorities can be assigned directly based on the estimated importance values, if such importance values have a wide range of values in a predetermined scale. Some implementations can resolve conflicts between content portions that have been estimated to have the same importance or importance value. For example, the importance information used for estimating importance, user preferences or behavior, and other information can be used to help resolve such conflicts for transmission priority. In one non-limiting example, an image content portion having the same importance value as a text document content portion can be assigned a higher transmission priority based on user preferences or other criteria indicating the importance of images over text.

In optional block 414, the method can perform enhancement processing of content data at the sending device before that data is transmitted to the destination device. For example, this enhancement can be selected by the sending user in preference settings or other information. In some examples, images can be enhanced via color correction, orientation correction, noise removal, blurred based on user preferences, etc. Text content can be checked for spelling, grammar, etc. Objects and faces can also be detected and associated user identities recognized in images, if such processing was not already performed in the importance estimation of block 410. Alternatively, such enhancement processing of the content can be performed at the destination device.

In block 416, the method transmits the content portions to the destination over the network in an order based on the transmission priorities assigned in block 412. In some implementations, content portions that have a sufficiently low importance and/or transmission priority (e.g., below a predetermined threshold) are not transmitted at all to the destination device, unless user commands or preferences indicate otherwise. Some implementations can start transmission of the content data after all the description data has been output for transmission. In other implementations, one or more portions of content data can be sent at least partially simultaneously with the description data, if sufficient bandwidth is available (e.g., over a predetermined threshold amount of bandwidth). In general, a description data portion will finish being transmitted to the destination device before its corresponding content portion. Some implementations can transmit multiple content portions at least partially simultaneously, if sufficient bandwidth is available (e.g., over a predetermined threshold amount of bandwidth). In one example, one content portion can be allocated more bandwidth than other content portions based on having a higher assigned transmission priority.

The method 400 also processes the blocks 420-426, which can be performed at least partially simultaneously with the blocks 406 to 416 as shown in the example implementation shown in FIG. 4. The blocks 420-426 provide checking for and processing events that can affect the transmission of content data to the destination over the network. In this example, such events include requests to access content data.

In block 420, the method checks whether a request for particular content in the content data has been made, e.g., a request for one or more particular parts of the content data. In some implementations, the method can check whether the request has been made within a predetermined time window from the present time. For example, this request may have originated from the sending user or another user who has connected with the destination device to access description data that was transmitted to the destination device, and now wishes to access (e.g., view or interact with) the part of the content data corresponding to that description data. For example, the user may wish to download the corresponding content part to his or her client device over the network, may wish to share the content part with other users of a social network service or other network service, may wish to edit the content part, etc.

In some implementations, such a request from a user can be received at the destination device from the user, and the destination device then sends information to the sending device indicating that the request has been received. In some implementations, the requested content part(s) may correlate with the portions of content organized for transmission as in block 408, while in other implementations the requested content parts may be different than the transmitted content portions, e.g., sub-portions or groups of one or more those content portions.

If no such request has been made, or if the requested content part(s) have already been fully received at the destination, then the block 420 waits for such a request (e.g., based on an event, interrupt, etc.). If a request has been made (e.g., within a predetermined time window of the present time) and requested content part(s) have not yet been fully received at the destination, then in block 422 the method 400 considers such requested content parts to be of high importance and sets the content portions corresponding to the requested content part(s) to the highest transmission priority. In effect, the status of a content part as being currently requested for access is another characteristic that the method 400 can examine in estimating importance of a content portion (that includes at some of that content part) and assigning a transmission priority to that content portion. In some implementations, the requested content portions are not necessarily set to the highest priority. For example, the requested portions may be increased in priority by a predetermined (or dynamically determined) amount based on the request, which in some cases may not cause the requested portions to have the highest current priority if other portions have an overall higher total importance value.

In block 424, the method pauses any current transmission of other content portions to the destination over the network. This allows the full bandwidth of the communication channel to the destination to be used for sending the requested content part(s) as quickly as possible. In other implementations, the current transmission of other content data can be reduced but still continued, rather than completely paused. In block 426, the method transmits the requested content part(s) to the destination. In other implementations, the method can transmit the requested content part(s) directly to a requester, if such a requester wants the content to be transmitted to a device different than the destination, for example. In block 428, the method resumes any transmission of content data that may have been paused in block 424 due to the interrupting request for particular content. The method then returns to block 420.

In some implementations, the destination device can modify the priorities of content portions and can modify the transmission of the content data. For example, the destination device can send one or more commands to the sending device to assign and/or change a priority of one or more specified content portions. Such commands can be considered events and can be monitored or received by the sending device similarly to requests checked in block 420. In some examples, the destination device can examine the description data and determine that particular portions of content data should have higher or lower priority. For example, the destination device may have better access to user preference information, importance information, or other information that can influence transmission priority of content portions. The destination device can consult this information and send appropriate commands to the sending device after determining priorities. In one example, the sending device can be bound to a network service operating on the destination device so that the network service can modify content portion prioritization on the fly.

In some implementations, all or a significant portion of the content data can be processed into description data that is proxy data, e.g., a representational form of the content data that is generally smaller in size as described above. This proxy data can be much smaller in data amount than the corresponding content data so that it can be sent more quickly to the destination device and/or to a different remote device over the network. A remote device can evaluate the corresponding content data for importance and/or transmission priority based on the received proxy data as described above, and send the determined importance values, transmission priorities, and/or transmission order for the corresponding content data to the sending device. For example, this allows a remote device such as a server that has more computational resources to determine importance and/or transmission priorities, using a variety of computational processes, more quickly and/or robustly than a less-capable local sending device. In some implementations, the remote device may determine that some portions of content data are not sufficiently important to transmit to the destination device (e.g., have low quality, are duplicative to other content, etc.) and can indicate this status to the sending device.

It should be noted that the blocks described in the methods of FIGS. 3 and 4 can be performed in a different order than shown and/or simultaneously (partially or completely) with other blocks, where appropriate. In some implementations, blocks can occur multiple times, in a different order, and/or at different times in the methods.

The blocks described above in methods 300 and 400 can be implemented on different types of systems in different implementations. In some implementations, all the blocks can be implemented on a particular system, such as a portable device, desktop computer, or other device. In other implementations, some of the blocks can be implemented on one system and other blocks implemented on a different system. In some examples, the derivation of description data can be performed by a first device, and transmission of the description data can be performed at a different, second device. The transmission of the content data can also be performed at the same and/or different device as the device performing importance estimation for content portions.

Figure 5:
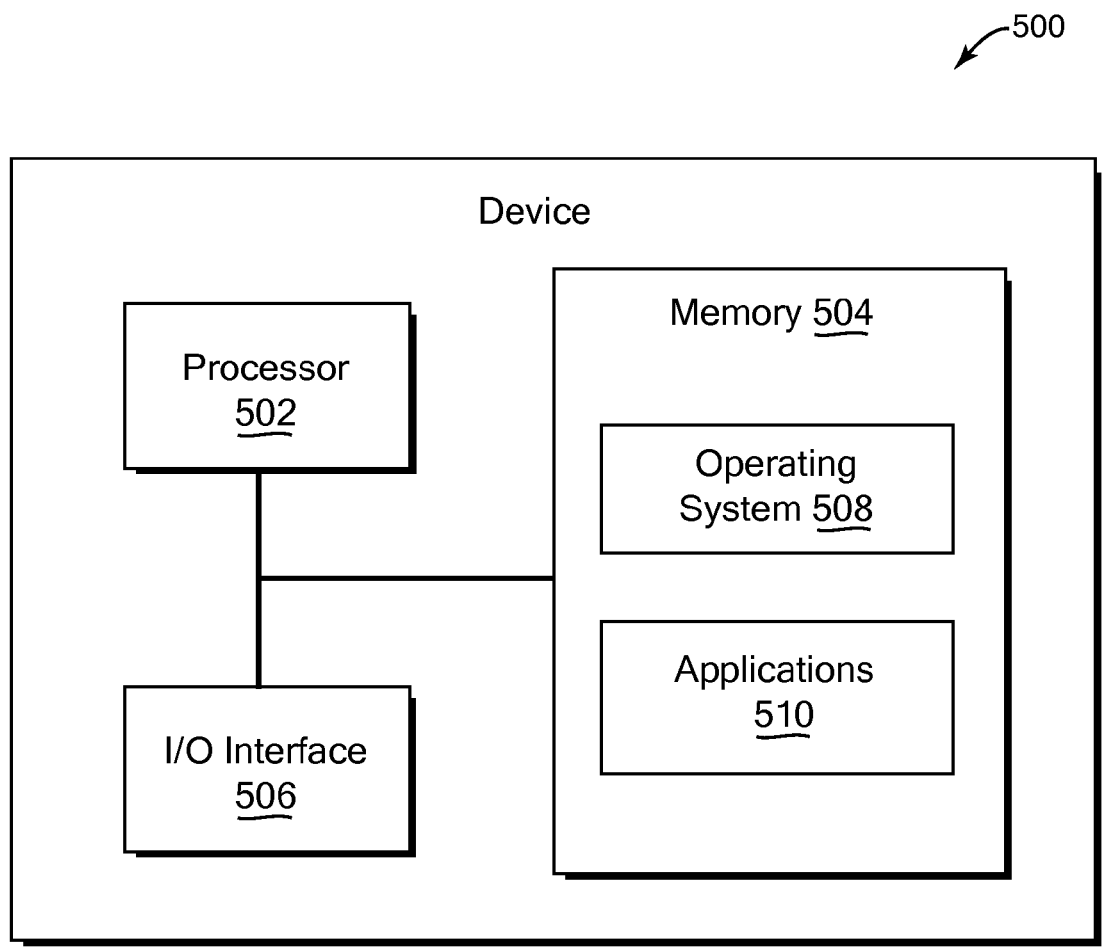
FIG. 5 is a block diagram of an example device which may be used for one or more implementations described herein.

FIG. 5 is a block diagram of an example device 500, which may be used to implement some implementations described herein. For example, device 500 can be used to implement any of the server system 102, client device 120, and local devices 122-126 shown in FIG. 1, and perform appropriate method implementations described herein. Device 500 can be any suitable computer system, server, or other electronic or hardware device. For example, the device 500 can be a portable computer, mainframe computer, desktop computer, workstation, or any other electronic device (portable device, cell phone, smart phone, tablet computer, head-mounted display device, television, TV set top box, personal digital assistant (PDA), media player, game device, etc.). In some implementations, device 500 includes a processor 502, a memory 504, and input/output (I/O) interface 506.

Processor 502 can be one or more processors, e.g., processing circuits or circuitry, to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the device 500 by the processor 502, including an operating system 508 and one or more application engines 510 including communication application software. In some implementations, the application engine 510 can include instructions that enable processor 502 to perform the functions described herein, e.g., some or all of the methods of FIGS. 3 and 4. Any of software in memory 504 can alternatively be stored on any other suitable storage location or computer-readable medium. In addition, memory 504 (and/or other connected storage device(s)) can store privacy settings, content, and other data used in the features described herein. Memory 504 and any other type of storage (magnetic disk, optical disk, magnetic tape, or other tangible media) can be considered "storage devices."

I/O interface 506 can provide functions to enable interfacing the device 500 with other systems and devices. For example, network communication devices, storage devices such as memory and/or database 106, and input/output devices can communicate via interface 506. In some implementations, the I/O interface can connect to interface devices such as input devices (touchscreen, keyboard or keypad, pointing device, microphone, camera, scanner, etc.) and output devices (display screen or other display device, audio speaker devices, printer, motor or other actuator, etc.). A display device, for example, can be used to display the settings, notifications, and/or other features as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions, and/or an actuator for outputting vibration or other forces.

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While device 500 is described as performing steps as described in some implementations herein, any suitable component or combination of components of device 500 or similar system, or any suitable processor or processors associated with such a system, may perform the steps described.

Device 500 can be a client device to provide one or more features described herein. A server device can also implement and/or be used with one or more features described herein. Some example server devices are described with reference to FIG. 1 and can include one or more components of the device 500, such as processor(s) 502, memory 504, and I/O interface 506. An operating system, software and applications suitable for the server device can be provided in memory and used by the processor, such as a web hosting engine, social networking engine, or other engine providing a network service. The I/O interface for device 500 can be connected to network communication devices, as well as to input and output devices.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, other descriptive information about the user, etc.). In addition, certain data may be treated in one or more ways before it is stored or used, so that personally identifiable information is removed and no personally identifiable information can be determined from the data. Thus, a user may have control over how information is collected about the user and used by a server or other device.

Although the description has been described with respect to particular implementations thereof, these particular implementations are merely illustrative, and not restrictive. Concepts illustrated in the examples may be applied to other examples and implementations.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   obtaining description data derived from content data, the description data describing the content data and being smaller in size than the content data, and wherein the description data includes one or more portions corresponding to one or more portions of the content data;
   causing the description data to be transmitted from a sending device to a destination device over a network to be made accessible at the destination device to one or more users;
   determining one or more priorities associated with the one or more portions of the content data;
   causing the one or more portions of the content data to be transmitted from the sending device to the destination device to be made accessible at the destination device to the one or more users, wherein transmission of at least one portion of the description data is completed prior to causing the one or more portions of the content data to be transmitted, and the at least one portion of the description data is made accessible before a corresponding portion of the content data is made accessible, and wherein causing the one or more portions of the content data to be transmitted includes prioritizing transmission of the one or more portions of the content data in a transmission order based on the one or more priorities;
   receiving an indication from the destination device that input from at least one user of the one or more users indicates a selected portion of the description data at the destination device to request access to an associated portion of the content data associated with the selected portion of the description data, wherein the indication is received while the associated portion of the content data is being transmitted to the destination device; and
   in response to the indication:
      changing an associated priority of the associated portion of the content data;
      pausing a current transmission over the network to the destination device of at least one other portion of the content data that has a lower priority than the associated priority; and
      causing transmission over the network of the associated portion of the content data to the destination device while the current transmission of the at least one other portion of the content data is paused, to cause the associated portion of the content data to be transmitted to the destination device before the at least one other portion of the content data.

2. A method comprising:
   obtaining description data derived from content data, the description data describing the content data and including one or more portions corresponding to one or more portions of the content data;
   causing the description data to be transmitted to a destination device over a network to be made accessible at the destination device to one or more users;
   determining one or more priorities associated with the one or more portions of the content data;
   causing the one or more portions of the content data to be transmitted to the destination device over the network to be made accessible at the destination device to the one or more users, wherein causing the one or more portions of the content data to be transmitted includes prioritizing transmission of the one or more portions of the content data in a transmission order based on the one or more priorities;
   receiving an indication from the destination device that input from at least one user of the one or more users indicates a selected portion of the description data at the destination device to request access to an associated portion of the content data associated with the selected portion of the description data, wherein the indication is received while the associated portion has not completed transmitting to the destination device; and in response to the indication:
increasing a priority of the associated portion of the content data relative to a priority of at least one other portion of the content data; and
increasing bandwidth for the associated portion of the content data in a connection to the destination device to cause the associated portion of the content data to complete transmission to the destination device before completion of transmission of the at least one other portion of the content data.

3. The method of claim 2 wherein the destination device is a server system and a sending device causes the one or more portions of the content data to be transmitted to the destination device, and further comprising:
requesting, by the sending device, the content data from one or more local devices in communication with the sending device over a second network; and
receiving the content data at the sending device from the one or more local devices over the second network.

4. The method of claim 2 wherein the description data is smaller in amount than the content data, and wherein the destination device includes a server system providing a network service over the network that enables the one or more users to access the description data and the content data received at the server system.

5. The method of claim 2 wherein the description data includes metadata of the content data, wherein the metadata includes one or more of title, author, subject, and date of creation of the content data.

6. The method of claim 2 wherein the content data includes video data, and the description data includes one or more video frames selected from the video data.

7. The method of claim 2 wherein the content data includes text data and the description data only includes one or more items of text extracted from the text data.

8. The method of claim 2 wherein each of the one or more priorities is based at least in part on one or more characteristics of the portion of the content data associated with the priority.

9. The method of claim 8 wherein the one or more portions of the content data include at least one of images and video frames, and wherein the one or more priorities are based on one or more visual characteristics of the images and the video frames, wherein the visual characteristics include at least one of blurriness, contrast, brightness, and pixel resolution.

10. The method of claim 2 further comprising:
receiving one or more commands from the destination device to modify particular priorities of one or more particular portions of the content data, wherein the one or more commands are based on the destination device processing one or more particular portions of the description data received by the destination device that are associated with one or more particular portions of the content data; and
modifying the particular priorities of the one or more particular portions of the content data based on the one or more commands.

11. The method of claim 2 wherein the at least one other portion of the content data corresponds to at least one unselected portion of the description data.

12. The method of claim 2 wherein determining the one or more priorities includes:

examining one or more characteristics of the one or more portions of the content data; and
assigning the one or more priorities to the one or more portions of the content data based on the one or more characteristics.

13. The method of claim 12 wherein the one or more characteristics include at least one of:
times of creation of the one or more portions of the content data; and
most recent times of modification of the one or more portions of the content data.

14. The method of claim 12 wherein the one or more characteristics include one or more recognized subjects depicted in the one or more portions of the content data, wherein the one or more recognized subjects include one or more faces associated with one or more persons depicted in the one or more portions of the content data,
wherein the one or more priorities are based on one or more social connections of the one or more persons associated with the one or more faces with respect to a sending user associated with a sending device that causes the one or more portions of the content data to be transmitted to the destination device.

15. The method of claim 2 wherein the priority assigned to each respective portion of the content data is based on a number of particular users associated with the respective portion of the content data, wherein the particular users have access to the description data.

16. The method of claim 2 wherein increasing the priority of the associated portion of the content data is performed in response to determining that the input from the at least one user has indicated the selected portion of the description data within a particular time window relative to a current time.

17. A system comprising:
a storage device; and
at least one processor coupled to the storage device and configured to perform operations comprising:
obtaining description data derived from content data, the description data describing the content data and including one or more portions corresponding to one or more portions of the content data;
causing the description data to be transmitted to a destination device over a network to be made accessible at the destination device to one or more users; and
determining one or more priorities associated with the one or more portions of the content data;
causing the one or more portions of the content data to be transmitted to the destination device over the network to be made accessible at the destination device to the one or more users, wherein causing the one or more portions of the content data to be transmitted includes prioritizing transmission of the one or more portions of the content data in a transmission order based on the one or more priorities, wherein at least one portion of the description data completes transmitting and is made accessible before a corresponding portion of the content data completes transmitting and is made accessible;
receiving an indication from the destination device that input from at least one user of the one or more users indicates a selected portion of the description data at the destination device to request access to an associated portion of the content data associated with the selected portion of the description data, wherein the indication is received while the associated portion has not completed transmitting to the destination device; and
in response to the indication:

changing an associated priority of the associated portion of the content data relative to a priority of at least one other portion of the content data; and increasing bandwidth for the associated portion of the content data in a connection to the destination device to cause the associated portion of the content data to complete transmission to the destination device before transmission of the at least one other portion of the content data.

18. The system of claim 17 further comprising assigning one or more description data priorities to the one or more portions of the description data, wherein causing the description data to be transmitted to the destination device includes prioritizing Response 7 the one or more portions of the description data relative to each other based on the one or more description data priorities.

19. The system of claim 17 wherein each respective priority of the one or more priorities that is determined for a respective portion of the content data is based on a number of times that a detected visual feature appearing in the respective portion of the content data is duplicated in the content data.

20. The system of claim 17 wherein the one or more priorities are based on stored user preferences of a sending user associated with the system and stored user preferences of one or more users socially connected to the sending user.

\* \* \* \* \*

UNITED STATES PATENT AND TRADEMARK OFFICE
CERTIFICATE OF CORRECTION

| | |
|---|---|
| PATENT NO. | : 9,886,415 B1 |
| APPLICATION NO. | : 13/947902 |
| DATED | : February 6, 2018 |
| INVENTOR(S) | : Cohen et al. |

Page 1 of 1

It is certified that error appears in the above-identified patent and that said Letters Patent is hereby corrected as shown below:

In the Claims

Column 27, Line 14, please delete "Response 7".

Signed and Sealed this
Fifth Day of May, 2020

Andrei Iancu
*Director of the United States Patent and Trademark Office*